Figure 1:
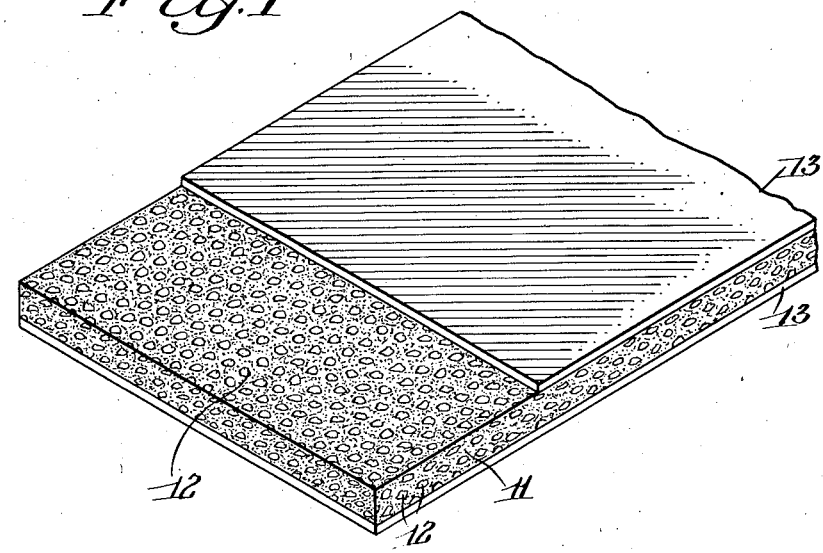

Feb. 7, 1933. H. M. SPENCER 1,896,689

BUILDING MATERIAL AND METHOD OF MAKING THE SAME

Original Filed Jan. 18, 1929

INVENTOR
Hugh M. Spencer
BY Edward H. Dumpston
his ATTORNEY

Patented Feb. 7, 1933

1,896,689

UNITED STATES PATENT OFFICE

HUGH M. SPENCER, OF LOCKPORT, NEW YORK, ASSIGNOR TO THE UPSON COMPANY, OF LOCKPORT, NEW YORK, A CORPORATION OF NEW YORK

BUILDING MATERIAL AND METHOD OF MAKING THE SAME

Original application filed January 18, 1929, Serial No. 333,530, Patent No. 1,847,366, dated March 1, 1932. Divided and this application filed February 23, 1932. Serial No. 594,688.

The present invention relates to building materials such as wallboard, and to methods of making such materials.

An object of the invention is the provision of an improved building material having a high degree of moisture resistance.

Another object is the provision of a satisfactory moisture-resistant building material made from a filler or fillers not heretofore commercially practical for use.

Another object is the provision of a building material made from ingredients which will produce a satisfactory moisture-resistant product without the necessity of heat treatment to temperatures so high that liners of cellulosic material might be scorched, and without the necessity of extremely fine grinding of the filler employed.

A further object is the provision of a building material requiring a less quantity of sodium silicate than heretofore without sacrifice of moisture resistance or other desirable qualities of the product.

A still further object is the provision of an improved and preferably continuous method of making a satisfactory building material having high moisture resistance.

To these and other ends the invention resides in certain improvements and combinations of parts, all as will be hereinafter more fully described, the novel features being pointed out in the claims at the end of the specification.

Figure 2:
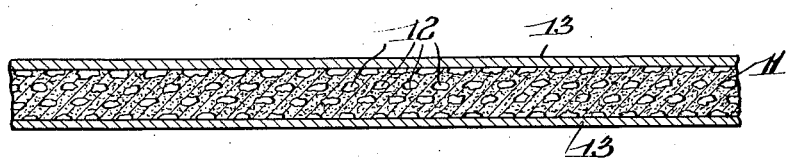

In the drawing:

Fig. 1 is a perspective view of a fragment of building material constructed in accordance with the present invention, and Fig. 2 is a fragmentary section through such material.

The same reference numerals throughout the several views indicate the same parts.

This application is a division of my application for intumescent silicate compositions filed January 18, 1929, Serial Number 333,530, which has matured into Patent Number 1,847,366, granted March 1, 1932.

It is known to make an intumescent cellular product from an intumescent agent or material, such as sodium silicate, and a filler. In such products, it has been suggested to use as a filler ground limestone, slate, slag, sand, ashes, clay, and similar materials. The mixture of intumescent material and filler may be made into a plastic mass, liners of sheet material may be applied thereto, and the liners with the interposed plastic core or filling may be passed continuously between heated platens to intumesce the core so as to form a cellular or porous structure which may then be passed, if necessary, through an additional heat treating device, such as an oven, to harden the core. Such a treatment may be carried on in the general manner disclosed, for example, in United States Patent No. 1,655,714, granted January 10, 1928, for an invention of Kemper Slidell. It results in a hard porous core having a multiplicity of small cells therein so that in cross section the core has an appearance somewhat like that of a slice of bread.

Prior to the present invention, products made in this manner were not sufficiently moisture-resistant for general use as wallboard and the like, unless certain grades of limestone were used as the filler, and unless such limestone were ground relatively finely. The requisite fine grinding was both difficult and expensive and could not be easily accomplished in ordinary commercial grinding mills. If certain other grades of limestone were used, whether coarsely or finely ground, or if the satisfactory grades of limestone were not ground relatively finely, or if the other materials such as slate, slag, ashes, sand, clay, and the like, were used as fillers, then the resulting product, while perhaps satisfactory under some circumstances for some uses, was not sufficiently water-resistant for general satisfactory use as a wallboard.

According to the present invention, it is found that a materially improved product may be obtained by adding to the mixture a relatively minor quantity of light magnesium carbonate. This results in a three-fold advantage. First, when light magnesium carbonate is employed according to the present invention, it permits the manufacture of a satisfactory moisture-resistant building material from a filler ground much more coarsely than was heretofore necessary. For example, a good grade of limestone which previously had to be ground to a fineness so that substantially ninety-five percent. thereof would pass through a two hundred mesh screen may now be used, according to the present invention, if ground so that approximately seventy-five percent. thereof would pass through a thirty mesh screen, when a minor quantity of light magnesium carbonate is added.

Second, the present invention renders suitable for use various filler materials which would otherwise not be suitable. For example, limestone of other grades, which previously would not make a commercially satisfactory product even when ground so that ninety-five percent. would pass through a two hundred mesh screen, may now be employed as a filler, and will result in a satisfactory moisture-resistant product when light magnesium carbonate is used according to the present invention. Furthermore, when light magnesium carbonate is employed, other filler materials such as slag, slate, ashes, sand, clay, and the like, may be used to form a satisfactory product, with the commercially requisite amount of moisture resistance, whereas previously such filler materials did not result in a commercially satisfactory board.

Third, the present invention permits a saving in the intumescent agent or material, without sacrifice of quality of the product. When sodium silicate is used as the intumescent material, a lesser quantity or a cheaper grade thereof may be employed without sacrifice of moisture resistance or other desirable qualities in the final product.

The light magnesium carbonate used according to the present invention is known in chemistry. It occurs in nature and it also may be manufactured artificially by known methods. An exact chemical formula for light magnesium carbonate cannot be given because its formula seems to vary to some extent depending on the different methods by which it is produced. The substance is known and definitely recognized in the chemical trade by the name "light magnesium carbonate", however, and any substance commonly called by this name is suitable for the purposes of the present invention, notwithstanding any slight variations in its chemical formula.

Light magnesium carbonate is commonly obtainable both in a pure grade suitable for medical use, and in a technical or commercial grade. The technical or commercial grade is satisfactory for the purposes of the present invention. Light magnesium carbonate is readily distinguishable from "heavy magnesium carbonate" by the much greater bulk of the light carbonate. That is, a given weight of light magnesium carbonate occupies a materially greater volume than the same weight of heavy magnesium carbonate. Ordinarily light magnesium carbonate has approximately three and one-half times the bulk of the heavy magnesium carbonate.

According to the present invention, light magnesium carbonate is added in a relatively minor quantity to the filler and intumescent material, and the quantity of light magnesium carbonate needed to produce the desired water-resistant character of the product is usually only a few percent. of the quantity of the filler. It appears to be immaterial, so far as the present invention is concerned, whether the filler and light magnesium carbonate be first mixed with each other in dry form before the addition of the intumescent material, or whether the filler and intumescent material be first mixed with each other before the light magnesium carbonate be added thereto, or whether all three be mixed together at once.

The exact quantity of light magnesium carbonate to be added will vary to some extent depending on the characteristics of the filler, the relative proportions of filler and intumescent material, the degree of water resistance desired in the final product, and other variable factors. The following actual examples of satisfactory mixtures will give a sufficient understanding of the invention to those skilled in the art. Some slight experimentation may possibly be necessary to determine the optimum amount of light magnesium carbonate for mixtures of other proportions or materials, since the determination of the optimum amount appears to be largely a matter of trial in each instance.

The fineness of size of the filler particles may vary to some extent, and mixtures of different sized particles may be employed. In general, however, it is preferred to crush or grind the filler so that approximately seventy-five percent. thereof will pass through a thirty mesh screen. Sand or other substances naturally occurring as small grains may be crushed to reduce the size of the grains, if they are too large. The filler may be made entirely of one material, or two or more materials may be mixed with each other in any desired proportions. Preferably the filler is entirely or mainly inorganic, although at times more or less organic material, such as sawdust for example, may be included in the filler if desired.

As one example, there may be taken 790 parts by weight of substantially dry sand, 10 parts by weight of light magnesium carbonate, and 300 parts by weight of a sodium silicate solution having a gravity of 48.5° Baumé. These may be mixed with each other to form a pasty or dough-like mass which may be placed between liners of sheet material and intumesced and hardened, as above described, in the general manner disclosed in Slidell Patent No. 1,655,714. The resulting product displays great moisture resistance and is admirably suited for use as a wallboard or building material. Its porous or cellular nature makes it relatively light. The relative quantity of sodium silicate given in this example is somewhat less than that ordinarily required for a similar mixture made according to the prior art and without the use of the light magnesium carbonate of the present invention.

As another example, showing the use of sodium silicate of a cheaper grade, there may be taken 800 parts by weight of substantially dry sand passing a 36 mesh screen, 12½ parts by weight of light magnesium carbonate and 317 parts by weight of sodium silicate solution having a gravity of 42.5° Baumé. This mixture may have liners applied thereto and may be molded and intumesced by heat in the manner above set forth, and makes a satisfactory product of high moisture resistance. It is to be noted that according to this example, the sodium silicate having a gravity of only 42.5° Baumé is of a cheaper or less concentrated grade than that heretofore generally required in the production of a satisfactory product according to the prior art.

In general, the amount or grade of sodium silicate may be reduced by employing a greater proportion of light magnesium carbonate, while still obtaining the same moisture resistance in the product, and a greater quantity or more concentrated solution of sodium silicate in general requires a less quantity of light magnesium carbonate in order to obtain the requisite moisture resistance.

The liners of sheet material above mentioned may be used on one or both surfaces of the product, or may be imbedded in an intermediate position in the product. Such liners may be of any suitable sheet material, such as paper, asbestos, cloth, or fabric of any kind. Ordinarily it is preferred to use a liner made at least in part of cellulosic material, such as a heavy grade of paper. It is to to be especially noted that the present invention permits the obtaining of satisfactory moisture-resisting characteristics in the product without the necessity of heat treatment to such a high degree that cellulosic liners would be in danger of scorching. For example, the temperature of the hottest treating oven, according to the present invention, may be at approximately 410° F. which will not scorch a liner of cellulosic material under ordinary conditions of actual manufacture, but which will produce a satisfactory moisture-resistant product when light magnesium carbonate is used according to this invention.

In the light of present knowledge it is not possible to state the exact manner in which the light magnesium carbonate produces the moisture-resistant characteristics of the products. It may be that the action is purely physical, the extremely fine particles of light magnesium carbonate filling up certain minute pores of the mixture, or perhaps absorbing the sodium silicate to produce a cementing action. It may be that a chemical or quasi-chemical reaction takes place, wholly or partly between the light magnesium carbonate and the intumescent material, such as sodium silicate, which may possibly react to form a more or less water-insoluble magnesium silicate.

In the drawing there is shown a piece of wallboard constructed in accordance with the present invention. The core of the wallboard is indicated by the numeral 11, and contains a large number of cells or pores, some of which are indicated by the numeral 12, so that the material has somewhat the porous cellular appearance of a slice of bread, although it is quite hard and rigid when the heat treatment is completed. In the drawing, two liners 13 are shown, one applied to each surface of the core 11. The core is found in use to have the characteristic of adhering with great tenacity to liners of paper, or the like, which are placed against the core material while it is still in a plastic state and before it is intumesced.

I claim:

1. Building material comprising a moisture-resistant intumesced core including sodium silicate, a filler, and a minor quantity of light magnesium carbonate, and a liner of sheet material adhering to a surface of said core.

2. Building material comprising a moisture-resistant intumesced core including sodium silicate, a filler, and light magnesium carbonate, the quantity of said light magnesium carbonate being relatively small in proportion to the quantity of said filler, and a liner of cellulosic sheet material adhering to a surface of said core.

3. Building material comprising a moisture-resistant intumesced core including an intumescent material, a filler, and light magnesium carbonate, the quantity of said light magnesium carbonate being relatively small in proportion to the quantity of said filler, and a liner of sheet material adhering to a surface of said core.

4. Wallboard comprising two liners of sheet material and a moisture-resistant intumesced core between said liners, said core including an intumescent material, a filler, and a minor quantity of light magnesium carbonate.

5. Wallboard comprising two liners of cellulosic sheet material and a porous core between said liners, said core including a ground inorganic filler and a minor quantity of light magnesium carbonate.

6. The method of making a building material which comprises forming a plastic mass including sodium silicate, a filler, and a quantity of light magnesium carbonate which is relatively small in proportion to the quantity of said filler, applying a liner of sheet material to said mass, and heating said mass to cause it to intumesce and to form a hard, cellular, moisture-resistant core adhering to said liner.

7. The method of making wallboard which comprises placing a plastic mass containing an intumescent material, a filler, and a minor quantity of light magnesium carbonate between two liners of sheet material, and heating said liners and the interposed mass to cause said mass to intumesce and to form a hard, moisture-resistant core.

8. The continuous method of making wallboard which comprises forming a plastic mass including a ground inorganic filler and a minor quantity of light magnesium carbonate, continuously forming said mass into a thin layer and applying a liner of cellulosic sheet material thereto, and continuously subjecting the associated mass and liner to a temperature below the scorching temperature of said liner, to transform said mass into a hard, moisture-resistant body adhering to said liner.

HUGH M. SPENCER.